May 22, 1962  J. F. COLLINS  3,035,368

TROLLING LURE

Filed March 8, 1961

INVENTOR
JOSEPH F. COLLINS.

BY  *B. P. Fishburne, Jr.*

ATTORNEY

United States Patent Office 3,035,368
Patented May 22, 1962

3,035,368
TROLLING LURE
Joseph F. Collins, 107 Longfellow St. NW.,
Washington, D.C.
Filed Mar. 8, 1961, Ser. No. 94,379
3 Claims. (Cl. 43—42.39)

This invention relates to fishing lures of the type used for trolling.

An object of the invention is to provide a trolling lure having readily interchangeable weight or sinking means rendering the lure adaptable for deep trolling or shallow trolling as desired.

A further object is to provide a lure having a body portion which revolves relative to the line when drawn through the water to attract the fish.

Another object is to provide a revolving lure having a reflecting stripe which will attract fish as the lure revolves in the water.

Still another object is to provide a lure of the above mentioned character made largely from commercially available parts which are easy to assemble and disassemble, thereby rendering the lure cheap to manufacture and easy to use.

Other objects and advantages of the invention will be apparent during the course of the following detailed description.

Figure 1:
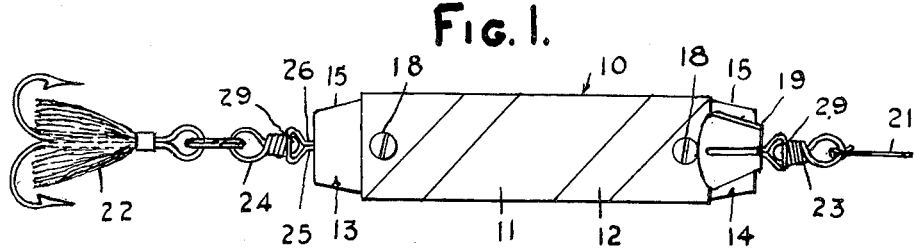
Figure 2:
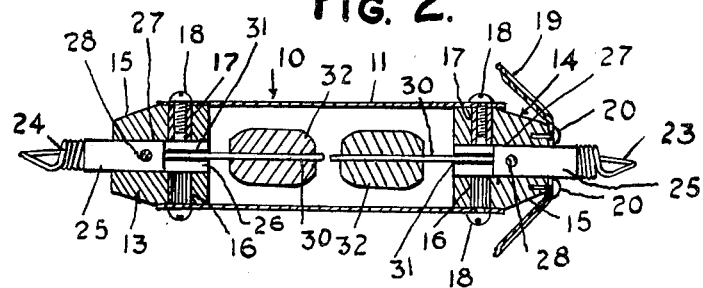
Figure 4:
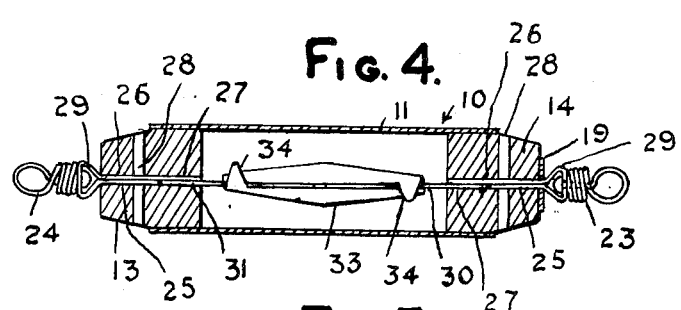
Figure 3:
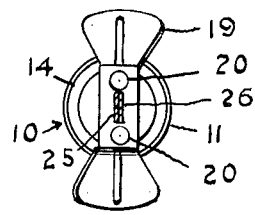

In the accompanying drawings forming a part of this application and in which like numerals are employed to designate like parts throughout the same, FIGURE 1 is a side elevation of a trolling lure according to the invention, FIGURE 2 is a central vertical longitudinal section through the same, FIGURE 3 is an end elevation of the lure, FIGURE 4 is a central vertical longitudinal section through a modified form of lure according to the invention.

In the drawings, wherein for the purpose of illustration are shown preferred embodiments of the invention, attention is directed first to FIGURES 1–3 of the drawings, wherein the numeral 10 designates generally a lure body including an open ended cylindrical tubular sleeve 11 formed of sheet metal, or the like. The sleeve 11 is preferably black although it may have any other preferably dark color, and is provided exteriorly with a continuous preferably spirally formed stripe 12 of silver or other reflecting color contrasting with the dark color of the sleeve 11.

The lure body 10 further comprises end plugs 13 and 14 of any desired material and including inner cylindrical portions which engage telescopically and removably within the end portions of the sleeve 11. The plugs 13 and 14 are preferably tapered beyond the ends of the sleeve 11 as shown at 15 and the plugs have flat inner and outer end faces. The plugs 13 and 14 are provided with diametrically opposed pairs of radial openings 16 receiving small internally screw-threaded radial sleeves 17, in turn receiving readily detachable radial screws 18 which serve to detachably rigidly secure the plugs 13 and 14 and associated elements to the sleeve 11.

The forward plug 14 carries a suitably pitched bladed impeller 19, rigidly secured at 20 to the forward end face of the plug 14, and the impeller 19 serves to impart continuous rotation to the lure body 10 on the longitudinal axis of the same as the lure is drawn through the water during trolling.

The fishing line 21 and trolling hook unit 22 are attached to the lure by conventional swivels 23 and 24 as indicated in FIGURE 1, whereby the lure body portion 10 is free to revolve under influence of impeller 19. Attaching elements 25 and 26 of strip material formed in the nature of cotter pins engage detachably within axial slots 27 formed through the plugs 13 and 14. The elements 25 and 26 are secured within the slots 27 by transverse through pins 28 or the like, as shown. The exterior heads 29 of elements 25 and 26 are connected to the swivels 23 and 24 as indicated in FIGURE 1.

Rods 30 of stiff wire or the like are fixedly secured in any suitable manner to the attaching elments 25 and 26 within the slots 27 as indicated at 31. These rods 30 project axially and centrally within the sleeve 11 and terminate near the longitudinal center of the sleeve, and each rod 30 is thus bodily carried by one of the plugs 13 or 14 and associated elements.

Within the sleeve 11, each rod 30 has a standard lead sinker weight 32 mounted thereon and secured thereto in a conventional manner. These lead weights may be removed from the rods 30 when the plugs 13 and 14 are removed from the sleeve 11, and the weights may be replaced by other similar weights which are larger or smaller than the weights shown in the drawing. By virtue of this arrangement, the trolling lure may have its overall weight varied between wide limits to facilitate trolling at great depths or at shallower depths and all depths in between, as desired.

In order to change or replace the weights 32, it is merely necessary to remove the radial screws 18 with a screwdriver and lift the plugs 13 and 14 out of the sleeve 11 with the various parts carried by the plugs. The weights are then interchanged as desired and the plug assemblies are merely re-inserted in the sleeve 11 and the screws 18 replaced.

As the lure is drawn through the water during trolling at the desired depth, the lure body 10 continuously revolves under influence of the bladed impeller 19 and the light reflecting stripe 12 functions in a manner similar to the spiral stripe on the well-known barber pole and tends to attract the fish.

In FIGURE 4, there is shown a slight modification of the invention employing a modified type of standard lead weight or sinker. The same body sleeve 11 shown in the prior form of the invention is employed, along with the same plugs 13 and 14, swivels 23 and 24, impeller 19, attaching elements 25 and 26 and through pins 28. The same weight holding axial rods 30 previously described are also employed in FIGURE 4, and except for the modified type of weight, the construction of the lure may be identical to that shown and described in connection with FIGURES 1–3.

In FIGURE 4, there is shown a well-known type of slotted lead weight or sinker 33 which straddles the inner ends of the rods 30 and is firmly detachably rigidly secured thereto by bendable lugs 34. The weight 33 may be detached from the rods 30 and interchanged with other weights of the same type but smaller or larger, as desired, in generally the same manner above described in connection with the prior form of the invention.

In connection with FIGURE 4, when the radial screws 18 are removed, the entire assembly including plugs 13 and 14, rods 30 and weight 33 may be slid endwise from the sleeve body portion 11. The weight 33 may then be removed from the rods 30 and replaced by another like weight of different size and the assembly is then reinserted into the sleeve 11 and secured by the elements 18.

The use or operation of the lure in FIGURE 4 for trolling or the like is the same as above described in the first form of the invention, and all parts not shown in FIGURE 4 are identical to corresponding parts shown and described in connection with FIGURES 1–3.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. An adjustable weight trolling lure comprising an open ended sleeve body portion, a pair of plugs engaging telescopically within the opposite end portions of the sleeve body portion, radial fastener elements detachably securing said plugs within the sleeve body portion rigidly, said plugs having aligned axial openings formed therethrough, a pair of separate axially extending rod elements disposed within said axial openings and extending outwardly and inwardly of the plugs and having corresponding ends terminating within the sleeve body portion near the longitudinal center thereof, transverse through pins interconnecting said rod elements and plugs rigidly, swivel elements connected with the rod elements outwardly of the plugs, lead weight means secured removably to the rod elements inwardly of the plugs and within the sleeve body portion, and a pitched impeller secured rigidly to one of said plugs exteriorly of the sleeve body portion and adapted to impart rotation to the lure upon its longitudinal axis.

2. The invention according to claim 1, and wherein said weight means is a pair of separate weights each clamped separately to one of said rod elements near said corresponding ends thereof within the sleeve body portion and bodily supported by the rod elements and spaced from the side wall of the sleeve body portion and spaced from said plugs.

3. The invention according to claim 1, and wherein said weight means is a single lead weight clampingly secured detachably to the inner end portions of the rod elements and spanning said corresponding ends thereof and bodily carried by the rod elements and spaced from said plugs and the side wall of the sleeve body portion.

References Cited in the file of this patent

UNITED STATES PATENTS

| | | |
|---|---|---|
| 1,470,842 | Hyams | Oct. 16, 1923 |
| 2,179,018 | Weidenmier | Nov. 7, 1939 |
| 2,230,456 | Henzie | Feb. 4, 1941 |
| 2,467,971 | Frair | Apr. 19, 1949 |
| 2,640,292 | Nadolny | June 2, 1953 |
| 2,741,056 | Sullivan et al. | Apr. 10, 1956 |
| 2,763,954 | Bunker | Sept. 25, 1956 |
| 2,862,325 | Magnus | Dec. 2, 1958 |